United States Patent

Gates et al.

[11] Patent Number: 6,043,474
[45] Date of Patent: Mar. 28, 2000

[54] ADDITIVE FOR CONTROLLING MICROWAVE HEATING RATES

[75] Inventors: Jeffrey A. Gates, West Chester, Ohio; Michael S. Sharp, Brookville, Ind.

[73] Assignee: Henkel Corporation, Gulph Mills, Pa.

[21] Appl. No.: 08/867,139

[22] Filed: Jun. 2, 1997

[51] Int. Cl.$^7$ ...................................................... H05B 6/80

[52] U.S. Cl. .......................... 219/730; 219/759; 426/241; 426/234; 99/DIG. 14

[58] Field of Search ..................................... 219/730, 759, 219/725; 426/107, 109, 241, 234, 243; 99/DIG. 14, 451

[56] References Cited

U.S. PATENT DOCUMENTS

| | | | |
|---|---|---|---|
| 4,971,817 | 11/1990 | Bauman et al. | 426/107 |
| 5,041,296 | 8/1991 | Byrne | 426/241 |
| 5,069,916 | 12/1991 | Buckholz et al. | 426/243 |
| 5,070,223 | 12/1991 | Colasante | 219/759 |

*Primary Examiner*—Philip H. Leung
*Attorney, Agent, or Firm*—John E. Drach; Steven J. Trzaska

[57] ABSTRACT

A process for controlling microwave heating rates involving: (a) providing a microwavable substrate; (b) combining the microwavable substrate with an additive consisting essentially of an aliphatic polyol to form a modified microwavable substrate; and (c) subjecting the modified microwavable substrate to microwave energy.

10 Claims, 3 Drawing Sheets

ADDITIVE FOR CONTROLLING MICROWAVE HEATING RATES

FIELD OF THE INVENTION

The present invention generally relates to a process for controlling the heating rate of microwave energy. More particularly, the invention relates to the use of certain diols in order to control the rate of heat generated by microwave ovens.

BACKGROUND OF THE INVENTION

The use of microwave ovens, primarily for the preparation of microwavable foods, has become quite prevalent in today's society due to both their convenience and speed at which they operate, i.e., generate heat. Microwave ovens operate by exciting molecules, resulting in the subsequent dissipation of heat. Water is one molecule readily excited by microwave energy, and is often times the major microwave absorber in many microwavable products.

While microwave ovens perform more than adequately at generating heat, the rate at which molecules are excited and heat dissipated is difficult to control. Depending on the amount of microwave energy (kilowatts) being deployed, the molecules in the substrate being heated are excited at some predetermined constant rate. While varying the amount of wattage used provides some measure of control, with respect to the rate at which molecules are excited and heat dissipated, the degree of control is minimal.

Moreover, in order to sufficiently excite molecules so as to achieve a certain degree of heat dissipation, a predetermined amount of energy/wattage must be employed. While the amount of energy required for satisfactory heat dissipation is not unreasonably high, any savings that could be realized by a reduction in the amount of energy needed without any attendant loss in heat dissipation would be highly desirable and advantageous.

It is therefore an object of the present invention to provide a means for controlling the degree of molecule excitation and consequently, heat dissipation.

It is also an object of the present invention to provide a means for increasing the degree of heat dissipation while using less energy.

SUMMARY OF THE INVENTION

The present invention is directed to a process for controlling microwave heating rates involving:
(a) providing a microwavable substrate;
(b) combining the microwavable substrate with an additive selected from the group consisting of ethylene glycol, propylene glycol, 1,4-butane diol, dimer diol, glycerine and mixtures thereof to form a modified microwavable substrate; and
(c) subjecting the modified microwavable substrate to microwave energy.

DESCRIPTION OF THE INVENTION

Other than in the operating examples, or where otherwise indicated, all numbers expressing quantities of ingredients or reaction conditions used herein are to be understood as being modified in all instances by the term "about".

It has been surprisingly discovered that certain additives have a tendency to enhance the degree to which molecules in a substrate are excited, thus causing more heat to be dissipated when the substrate is exposed to microwave energy, thus providing energy cost savings. As was noted above, water is a molecule that is readily excited by microwaves and is often times the primary microwave absorber in microwavable substrates. Thus, it has also been discovered that by combining water with an additive of the present invention, heating rates can be controlled over a continuum between water and the additive.

The additives which may be employed in accordance with the present invention, as heat controlling additives, are aliphatic polyols. Examples of aliphatic polyols which may be used include, but are not limited to, ethylene glycol, propylene glycol, 1,3 propane diol, 1,4-butane diol, glycerin, 1,3 butylene glycol, neopentyl glycol, penta-erythritol, di-penta-erythritol, and mixtures thereof. A particularly preferred aliphatic polyol is glycerin.

As to the microwavable substrates which may be employed, any substrates capable of being microwaved are contemplated by the present invention. Examples of microwavable substrates which may be employed include, but are not limited to, microwavable food items, heat packs, compresses, and the like.

The microwave energy used to excite the molecules in the microwavable substrate will have a frequency ranging from about 500 to about 100,000 MHz, and preferably from about 900 to about 2500 MHz.

According to one aspect of the invention, there is provided a process for controlling the rate at which a microwavable substrate is heated by combining it with an effective amount of the above-disclosed polyol. The precise effective amount will depend on the particular microwavable substrate employed and the precise degree (continuum) of heating desired. In a particularly preferred embodiment of the present invention, the additive further includes water, in admixture with a polyol. Once again, the ratio by weight of water:polyol will be dependent on the particular microwavable substrate employed and the precise degree (continuum) of heating desired. In a particularly preferred embodiment, the ratio by weight of water to polyol will range from about 1:10 to about 10:1.

The present invention will be better understood from the examples which follow, all of which are meant to be illustrative only and are not meant to unduly limit the scope of the invention in any way. Unless otherwise indicated, percentages are on a weight-by-weight basis.

EXAMPLES

Figure 1:
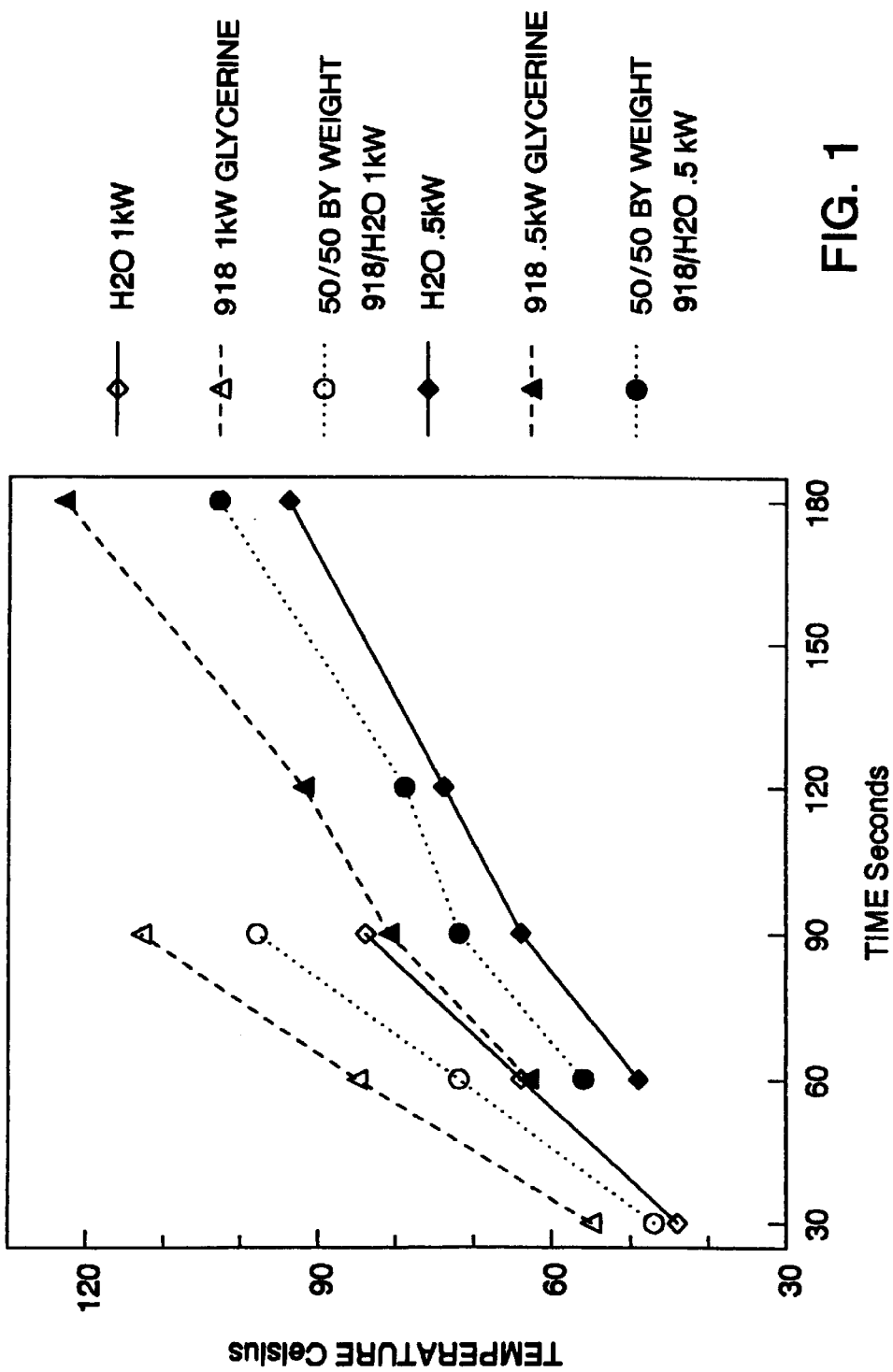
FIG. 1 is a graph illustrating the heat generated when glycerin, water and mixtures thereof are exposed to varying degrees of microwave energy over time.
Figure 2:
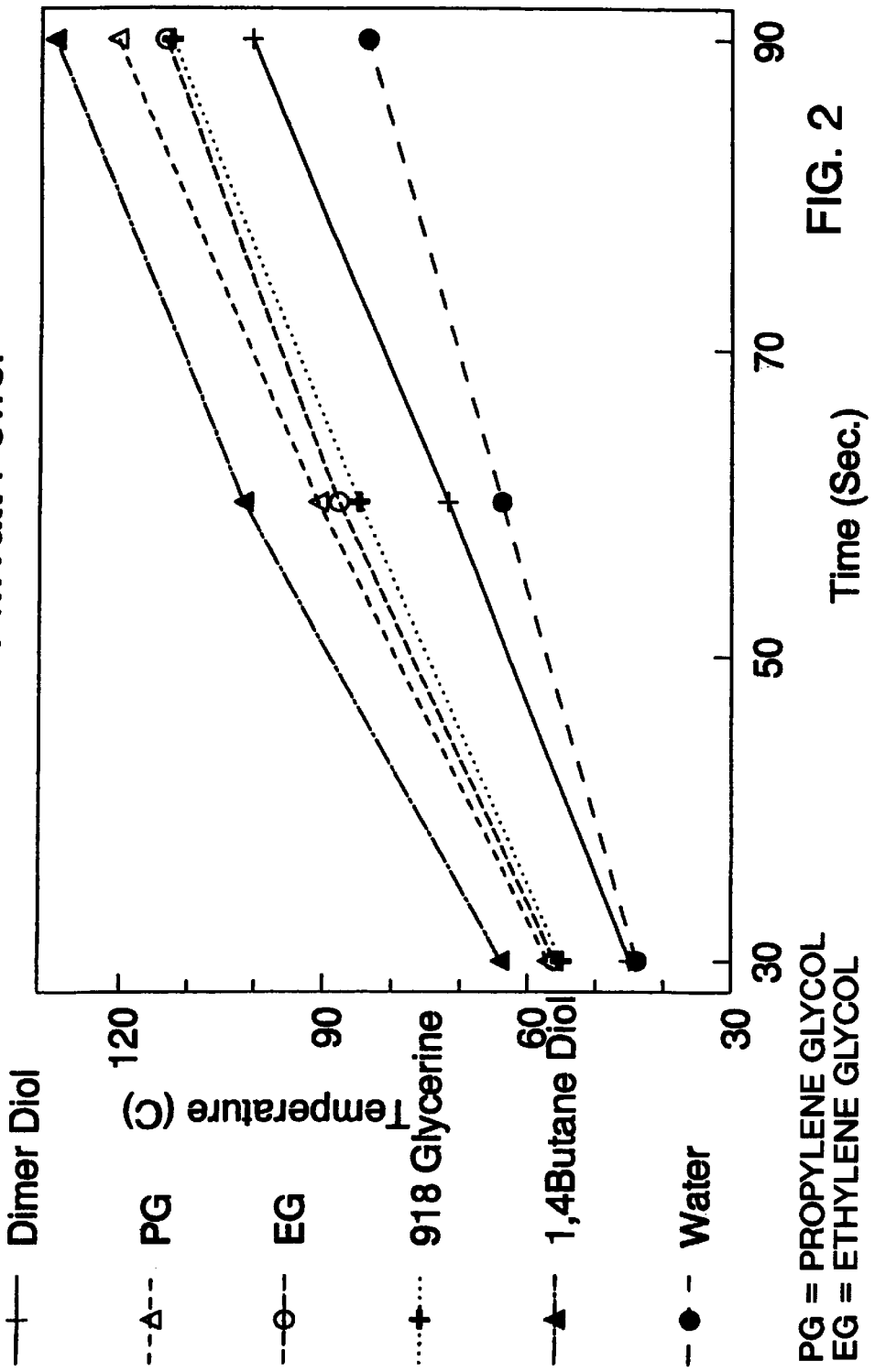
FIG. 2 is a graph illustrating the heat generated when water and other diols are exposed to 1 kilowatt of microwave energy over time.
Figure 3:
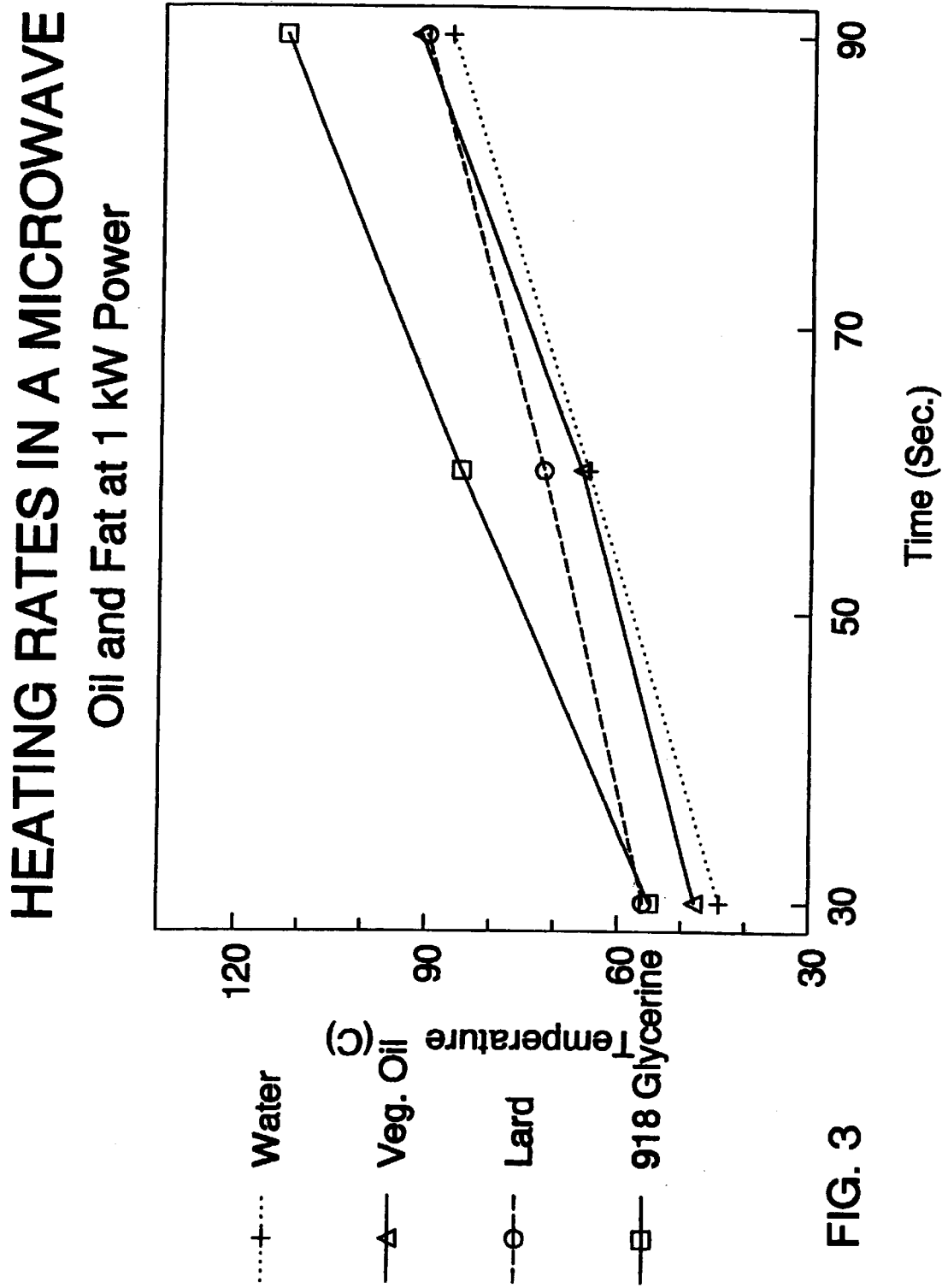
FIG. 3 is a graph illustrating the heat generated when glycerin, water, vegetable oil and lard are exposed to 1 kilowatt of microwave energy over time.

Various polyols, water, and mixtures thereof, in sample sizes of 175 ml, and at starting temperatures of 24° C. were heated in a conventional microwave oven, over varying time intervals and at varying microwave power levels, to determine their heating rates. The results hereof are found in Tables 1 and 2 below, as well as FIGS. 1–3.

TABLE 1

| | DI water | glycerin | water/glycerin (50/50) | water/glycerin (20/80) |
|---|---|---|---|---|
| Time at 1 KW | | | | |
| 30 sec | 44° C. | 55° C. | 47 ° C. | 56° C. |
| 60 sec | 64° C. | 85° C. | 72° C. | 84° C. |
| 90 sec | 84° C. | 113° C. | 98° C. | 110° C. |
| Time at .5 KW | | | | |
| 60 sec | 49° C. | 63° C. | 56° C. | 62° C. |
| 90 sec | 64° C. | 81° C. | 72° C. | 77° C. |
| 120 sec | 74° C. | 92° C. | 79° C. | 87° C. |
| 180 sec | 94° C. | 123° C. | 103° C. | 114° C. |

TABLE 2

| Time at 1 KW | dimer diol | propylene glycol | ethylene glycol | 1,4-butane diol | glycerin | veg. oil | lard | DI water |
|---|---|---|---|---|---|---|---|---|
| 30 sec | 45 | 57 | 56 | 64 | 55 | 48 | 56 | 43 |
| 60 sec | 72 | 91 | 88 | 102 | 85 | 66 | 72 | 67 |
| 90 sec | 101 | 121 | 114 | 130 | 113 | 92 | 91 | 91 |

What is claimed is:

1. A process for controlling microwave heating rates comprising:
   (a) providing a microwavable substrate;
   (b) combining the microwavable substrate with an additive consisting essentially of an aliphatc polyol and water, in a ratio by weight of from about 1:10 to about 10:1, to form a modified microwavable substrate; and
   (c) subjecting the modified microwavable substrate to microwave energy.

2. The process of claim 1 wherein the aliphatic polyol is selected from the group consisting of ethylene glycol, propylene glycol, 1,3 propane diol, 1,4-butane diol, glycerin, 1,3 butylene glycol, neopentyl glycol, penta-erythritol, di-penta-erythritol, and mixtures thereof.

3. The process of claim 1 wherein the microwavable substrate is selected from the group consisting of a microwavable food item, a heating pack and a compress.

4. The process of claim 1 wherein the polyol is glycerin.

5. The process of claim 1 wherein the additive further comprises water.

6. The process of claim 1 wherein the microwave energy has a frequency ranging from about 500 to about 100,000 Mhz.

7. The process of claim 6 wherein the microwave energy has a frequency ranging from about 900 to about 2500 MHz.

8. A process for controlling microwave heating rates comprising:
   (a) providing a microwavable food item;
   (b) combining the microwavable food item with an additive consisting of a mixture of water and glycerin in a ratio by weight ranging from about 1:10 to about 10:1 to form a modified microwavable substrate; and
   (c) subjecting the modified microwavable substrate to microwave energy.

9. The process of claim 8 wherein the microwave energy has a frequency ranging from about 500 to about 100,000 Mhz.

10. The process of claim 9 wherein the microwave energy has a frequency ranging from about 900 to about 2500 MHz.

* * * * *